United States Patent
Schreiner et al.

(10) Patent No.: US 8,880,040 B2
(45) Date of Patent: Nov. 4, 2014

(54) MOBILE NETWORK OPERATOR IDENTIFICATION

(75) Inventors: J. Sage Schreiner, Kirkland, WA (US); Jeremy Corley, Clyde Hill, WA (US); Rahul Dhar, Seattle, WA (US); Ori Bar-Niv, Kirkland, WA (US); Steve Lunsman, Redmond, WA (US); Tal Goldbloom, Seattle, WA (US); Derrick Tan, Mountain View, CA (US); Sean Nordberg, Bellevue, WA (US); Matt Pisut, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 407 days.

(21) Appl. No.: 13/308,392

(22) Filed: Nov. 30, 2011

(65) Prior Publication Data
US 2012/0302224 A1    Nov. 29, 2012

Related U.S. Application Data

(60) Provisional application No. 61/489,207, filed on May 23, 2011.

(51) Int. Cl.
| | |
|---|---|
| *H04M 3/42* | (2006.01) |
| *H04W 4/00* | (2009.01) |
| *H04M 1/68* | (2006.01) |
| *H04M 3/00* | (2006.01) |
| *H04M 11/00* | (2006.01) |
| *H04M 1/00* | (2006.01) |
| *H04W 8/20* | (2009.01) |
| *H04W 48/18* | (2009.01) |

(52) U.S. Cl.
CPC .............. *H04W 8/205* (2013.01); *H04W 48/18* (2013.01)

USPC ........ 455/414.1; 455/405; 455/411; 455/418; 455/419; 455/432.1; 455/552.1; 370/328; 370/329

(58) Field of Classification Search
USPC ........... 455/411, 414.1, 432.1, 405, 418, 419, 455/552.1; 709/226; 370/328–329
See application file for complete search history.

(56) References Cited

U.S. PATENT DOCUMENTS

| | | | |
|---|---|---|---|
| 7,152,230 B2 * | 12/2006 | Sato et al. | 717/178 |
| 7,542,451 B2 * | 6/2009 | Cooper et al. | 370/335 |

(Continued)

FOREIGN PATENT DOCUMENTS

| | | |
|---|---|---|
| WO | WO 2006/113834 | 10/2006 |

OTHER PUBLICATIONS

International Search Report and Written Opinion, PCT Application No. PCT/US2012/038793, Aug. 30, 2012, 9 pages.

(Continued)

*Primary Examiner* — Inder Mehra
(74) *Attorney, Agent, or Firm* — Bryan Webster; Kate Drakos; Micky Minhas

(57) ABSTRACT

A mobile device can send a mobile operator identification request to a mobile operator identification server to determine the mobile network operator for a mobile device. The request comprises mobile operator identifier data, which can include data stored at mobile device smart cards and in mobile device memory. The identification server comprises an identification engine that determines whether the identifier data satisfies one of a plurality of mobile operator rules. If a rule is satisfied, mobile operator identification data is sent to and stored at the mobile device. The mobile device can share the mobile operator identification data with mobile device provider online marketplaces to take advantage of business relationships between the mobile operator and the mobile device provider. Identification of the mobile operator is also useful for determining the appropriate billing methods and ensuring the proper mobile operator branding information is presented at the mobile device.

18 Claims, 6 Drawing Sheets

(56) References Cited

U.S. PATENT DOCUMENTS

| | | | |
|---|---|---|---|
| 7,738,891 B2* | 6/2010 | Tenhunen et al. | 455/512 |
| 8,228,861 B1* | 7/2012 | Nix | 370/329 |
| 2005/0039107 A1* | 2/2005 | Hander et al. | 715/500 |
| 2006/0149671 A1* | 7/2006 | Nix et al. | 705/40 |
| 2006/0229071 A1* | 10/2006 | Haverinen et al. | 455/432.1 |
| 2009/0030757 A1 | 1/2009 | Admon et al. | |
| 2009/0204997 A1* | 8/2009 | Xu et al. | 725/54 |
| 2009/0275363 A1 | 11/2009 | McGregor et al. | |
| 2009/0281947 A1 | 11/2009 | Erel | |
| 2010/0153227 A1 | 6/2010 | Medvinsky et al. | |
| 2010/0198975 A1 | 8/2010 | Willars et al. | |
| 2010/0222041 A1 | 9/2010 | Dragt | |
| 2010/0262506 A1* | 10/2010 | Zargahi et al. | 705/26 |
| 2010/0262619 A1* | 10/2010 | Zargahi et al. | 707/770 |
| 2010/0330986 A1* | 12/2010 | Rahman et al. | 455/432.1 |
| 2011/0007726 A1* | 1/2011 | Xie et al. | 370/338 |
| 2012/0042076 A1* | 2/2012 | Kawa et al. | 709/226 |
| 2012/0230587 A1* | 9/2012 | Arseneau | 382/182 |

OTHER PUBLICATIONS

Tsalgatidou et al., "Mobile Electronic Commerce: Emerging Issues," *Proceedings of EC-WEB 2000, 1st International Conference on E-Commerce and Web Technologies*, London, UK, Sep. 4-6, 2000, Lecture Notes in Computer Science, 1875, Springer, pp. 477-486.

\* cited by examiner

MOBILE NETWORK OPERATOR IDENTIFICATION

CROSS REFERENCE TO RELATED APPLICATIONS

This application claims priority to and the benefit of U.S. Patent Application No. 61/489,207, filed on May 23, 2011, which is incorporated herein by reference.

BACKGROUND

Network services utilized by mobile computing devices are provided by various mobile network operators and mobile virtual network operators. In some cases, a mobile computing device can be tethered to a single mobile network operator. In other cases, the mobile network operator currently providing network services for a mobile computing device can be based on various factors, such as information stored on a Subscriber Identity Module (SIM) card inserted in the mobile device and the mobile device's location (for example, which country the device is located in or whether the device is located out of its "home" network (i.e., the device is "roaming")).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a mobile computing device requests identification of the mobile network operator that the device is using to access a mobile network. The request is sent to a remote mobile operator identification server and comprises information pulled from the mobile device and any smart card, such as a SIM card, inserted in the device. If the server can determine the mobile operator based on the supplied data, the mobile device receives information identifying the mobile operator, along with associated configuration information. Configuration information can include information that can be used by the mobile device or an online marketplace to allow a mobile device user to take advantage of business relationships, such as offering special discounts on goods and services, between the mobile device provider and the identified mobile operator. An identification request can be made when a new SIM card (or any other type of smart card, such as an R-UIM or UICC card) is inserted into the mobile device or when a device switches subscriber identities.

In another embodiment, a mobile operator identification server receives a mobile operator identification request from a mobile device. The request comprises data pulled from the mobile device. The service compares the received data against a set of mobile operator rules in an attempt to determine the identity of the mobile operator. If at least one of the rules is satisfied, and the satisfied rules unambiguously identify the mobile operator, information identifying the mobile operator and associated configuration data is sent to the mobile device.

In another embodiment, a mobile device can supply information identifying a mobile operator to an online marketplace operated by the mobile device provider. If the mobile operator is one with which the mobile device provider has a business or commercial relationship, the mobile device user is presented with special discounts, product or service offerings or other deals according to the business relationship.

Identification of the mobile operator also provides for branding information specific to the identified mobile operator to be presented at the mobile device, as well as billing settings (e.g., bill messages, billing delivery format) to be appropriately set.

The foregoing and other objects, features and advantages of the invention will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

Figure 1:
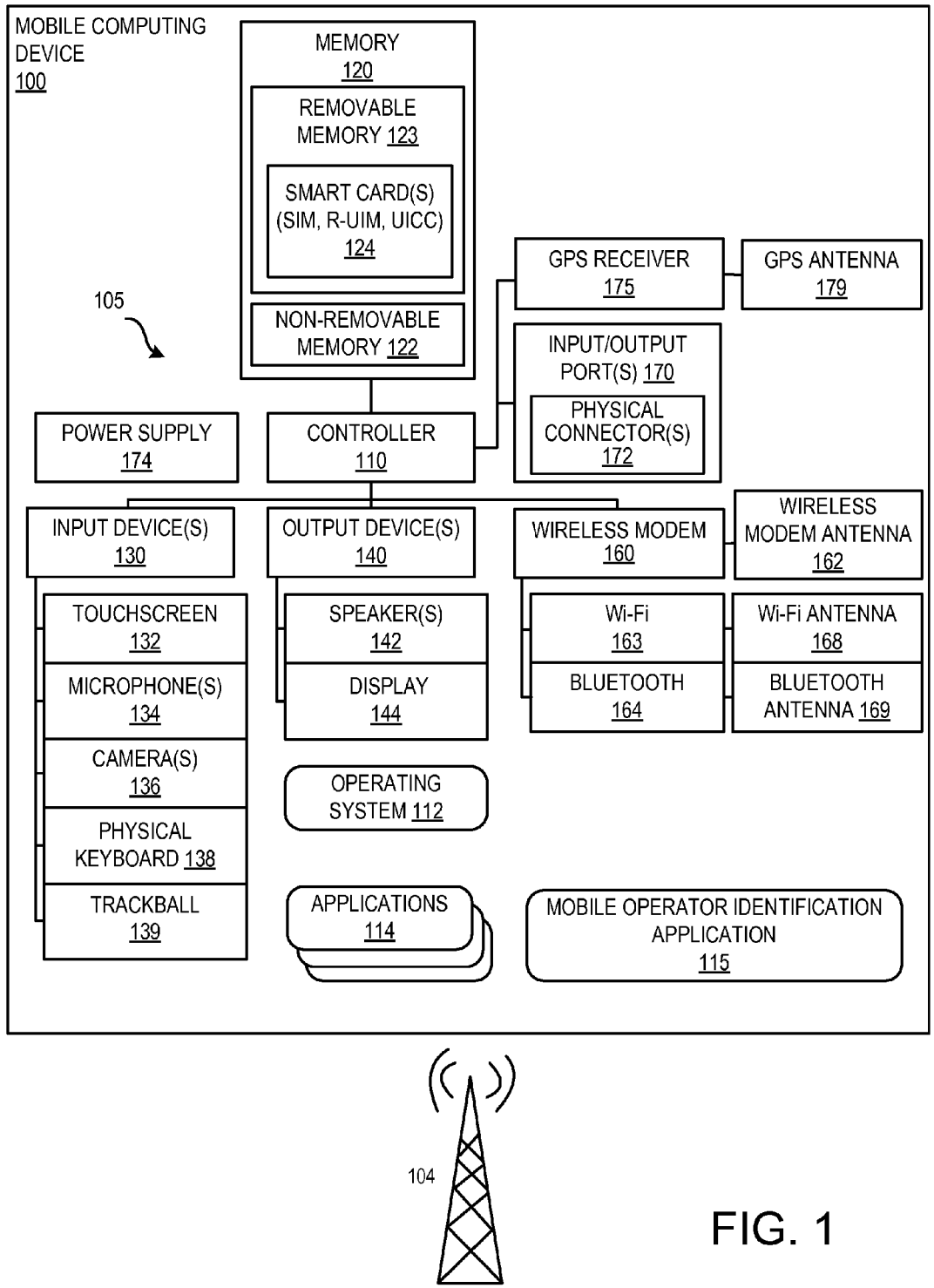
FIG. 1 is a system diagram depicting an exemplary mobile computing device.

FIG. 1 is a system diagram depicting an exemplary mobile computing device 100 that can be used to perform methods described herein. The mobile computing device 100 can include a variety of optional hardware and software components 105. Generally, components 105 can communicate with other components, although not all connections are shown, for ease of illustration. The mobile computing device 100 can be any of a variety of mobile computing devices (e.g., cell phone, smartphone, handheld computer, laptop computer, notebook computer, tablet device, slate device, media player, Personal Digital Assistant (PDA), camera, video camera) and can allow wired or wireless communication with one or more networks 104, such as a Wi-Fi, terrestrial cellular or satellite network.

The mobile computing device 100 can include a controller or processor 110 (e.g., signal processor, graphics processing unit (GPU), microprocessor, ASIC, or other control and processing logic circuitry or software) for performing such tasks as signal coding, graphics processing, data processing, input/output processing, power control, and/or other functions. An operating system 112 can control the allocation and usage of the components 105 and support for one or more application programs 114. The application programs 114 can include common mobile computing applications (e.g., email applications, calendars, contact managers, web browsers, messaging applications) as well as other computing applications, such as a mobile operator identification application 115 that retrieves data from a smart card(s) 124 and/or non-removable memory 122 for inclusion in a mobile operator identification request, and sends mobile operator identification requests. The smart card 124 is typically any removable card that comprises circuitry (e.g., memory, microprocessor) that is used for identification purposes. The smart card can also be used for authentication, data storage, application processing, etc. Particular smart cards are described herein, but other cards can be used.

The mobile computing device 100 can include memory 120. Memory 120 can include non-removable memory 122 and removable memory 123. The non-removable, or embedded memory, 122 can include RAM, ROM, flash memory, a hard drive, or other well-known memory storage technologies. The removable memory 123 can include flash memory cards (e.g., SD (Secure Digital) cards), memory sticks, or other well-known memory storage technologies, such as "smart cards." In FIG. 1, the removable memory 123 comprises one or more smart cards 124. The smart cards 124 can be a SIM card, a Removable User Identity Module (R-UIM) card, a Universal Integrated Circuit Cards (UICC) card or any other type of smart card. The memory 120 can be used for storing data and/or computer-executable instructions for running the operating system (OS) 112 and the application programs 114 on the device 100. Example data can include web pages, text, images, sound files, video data or other data sets to be sent to and/or received from one or more network servers or other devices by the mobile computing device 100 via one or more wired or wireless networks. The computing device 100 can also have access to external memory (not shown) such as external hard drives.

The mobile computing device 100 (mobile device) can support one or more input devices 130, such as a touch screen 132, microphone(s) 134, camera(s) 136, physical keyboard 138 and/or trackball 139 and one or more output devices 140, such as speaker(s) 142 and a display 144. Other possible output devices (not shown) can include piezoelectric or other haptic output devices. Any of the input devices 130 and output devices 140 can be internal to (as shown), external to, or removably attachable with the computing device 100. External input and output devices 130 and 140 can communicate with the computing device 100 via a wired or wireless connection. Some devices can serve more than one input/output function. For example, touchscreen 132 and display 144 can be combined in a single input/output device.

A wireless modem 160 can be coupled to a wireless modem antenna 162 and can support two-way communications between the mobile computing device 100 and external devices, as is well understood in the art. The modem 160 and the antenna 162 are shown generically and can be a wireless cellular modem for communicating with a mobile cellular communication network. The wireless modem 160 can comprise other radio-based modems such as a Wi-Fi modem 163 or a Bluetooth modem 164, each of which can be coupled to its own antenna (e.g., Wi-Fi antenna 168, Bluetooth antenna 169). The wireless modem 160 is typically configured for communication with one or more cellular networks, such as a GSM network for data and voice communications within a single cellular network, between cellular networks, or between the mobile computing device and a public switched telephone network (PSTN).

The mobile computing device 100 can further include at least one input/output port 170 (which can be, for example, a USB port, IEEE 1394 (FireWire) port, and/or RS-232 port) comprising physical connectors 172 and a power supply 174, a satellite navigation system receiver such as a GPS receiver 175. The GPS receiver 175 can be coupled to a GPS antenna 179.

The mobile computing device 100 can be a GSM device (i.e., the device conforms to the GSM (Global System for Mobile Communication) standard), a CDMA device (i.e. the device employs Code Division Multiplexing Access (CDMA) or conforms to a CDMA-based standard such as CDMA2000), a dual mode device (i.e., a device that is compatible with both GSM and CDMA networks), or a device that conforms to any other mobile communication standard such as LTE (3GPP (3rd Generation Partnership Project) Long Term Evolution) and SVLTE (Simultaneous Voice and Long Term Evolution data), or employs any other channel access method (e.g., Time Division Multiplexing Access (TDMA)).

The mobile computing device 100 can comprise one or more smart card slots for receiving one or more smart cards (e.g., SIM, R-UIM, UICC cards) that store network subscriber identification data and smart card identification data. For example, a GSM device comprises one or more slots that accept Subscriber Identity Module (SIM) smart cards (SIM cards). A SIM card stores an International Mobile Subscriber Identity (IMSI) that uniquely defines a mobile operator subscriber. Typically, the first three digits of an IMSI are the Mobile Country Code (MCC), the next 2 or 3 digits are the Mobile Network Code (MNC) and the remaining digits are the Mobile Subscription Identification Number (MSIN). The MSIN identifies a subscriber for a given mobile operator. SIM cards also store an Integrated Circuit Card Identifier (ICCID), which is the serial number of the SIM card. SIM cards store additional data in elementary files (EFs) such as an operator name string (EF_ONS), service provider name (EF_SPN), group identifier level (EF_GID1 and EF_GID2) values, PLMN (Public Land Mobile Network) network name (EF_PNN), and an operator PLMN list (EF_OPL, a prioritized list of Location Area Information (LAI) identities used to associated a specific operator name in EF_PNN with a LAI). In some embodiments, the functionality of or the information stored on the smart cards is integrated into the mobile computing device 100.

The memory 120 can store identifiers for the mobile computing device 100 such as an International Mobile Equipment Identifier (IMEI), which uniquely identifies a GSM mobile device, or an Electronic Serial Number (ESN) or a Mobile Equipment Identifier (MEID) that uniquely identifies a CDMA phone.

Another example of a mobile computing device smart card is the Removable User Identity Module (R-UIM) that can be used in CDMA devices. R-UIMs store an IMSI and additional data such as a Temporary Mobile Subscriber Identifier (TMSI); a Network Access Identifier (NAI), a User Identity Module Identifier (UIMID), an Expanded UIMID (EUIMID) or ICCID hardware identifiers, as well as additional information for CDMA operation. IMSIs that can be stored on an R-UIM include an IMSI-M and an IMSI_T. IMSI_M is an MIN-based (Mobile Identification Number, a unique number that a wireless carrier uses to identify a mobile phone) IMSI that uses the lower 10-digits of the IMSI to store the MIN, and IMSI_T is a "true" IMSI that is not associated with an MIN. A third example of a mobile computing device smart card is the Universal Integrated Circuit Cards (UICC) that can be used with either GSM or CDMA devices. The mobile computing device 100 can accept additional smart cards that enable the mobile computing device to access a mobile network via the services of a mobile operator.

The mobile computing device 100 can have access to more than one subscriber identity (e.g., due to two SIM cards being inserted into the device, each card storing one subscriber identity, or one SIM card being inserted into the device storing more than one subscriber identity) and can switch between identities. Mobile devices containing two smart cards can switch between smart cards 124 or operate both cards simultaneously.

Subscriber and equipment identifiers stored on the smart cards 124, such as IMSI and ICCID values, as well as any other data stored on the smart cards 124 or in mobile computing device memory 120 can be transmitted to a mobile operator identification server as part of a mobile operator identification request to identify a mobile operator of the mobile computing device 100.

The illustrated components 105 are not required or all-inclusive, as any components can be deleted and other components can be added.

Figure 2:
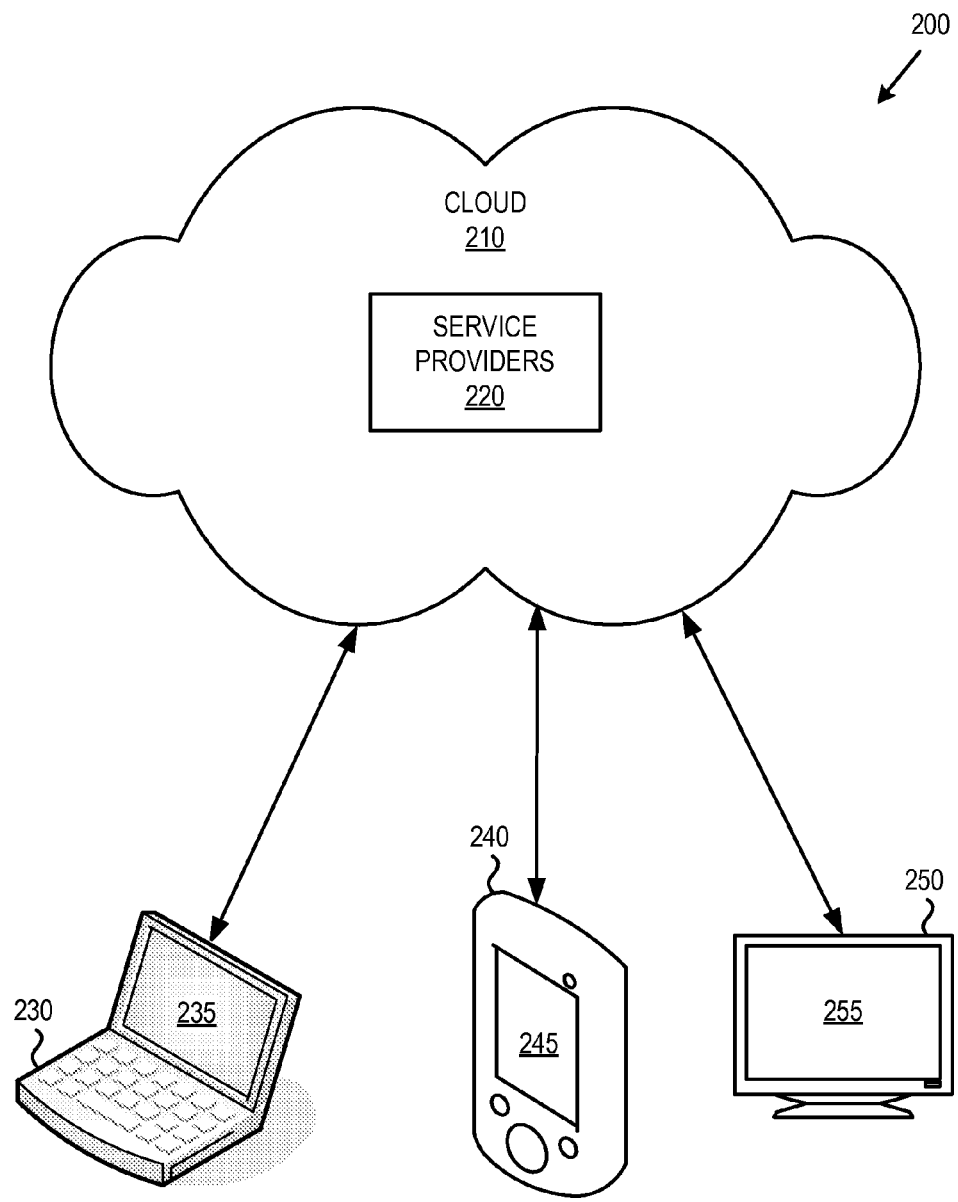
FIG. 2 illustrates a generalized example of a suitable implementation environment in which described embodiments, techniques, and technologies may be implemented.

FIG. 2 illustrates a generalized example of a suitable implementation environment 200 in which described embodiments, techniques, and technologies may be implemented. In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks, For example, some tasks (e.g., processing user input and presenting a user interface) can be performed on local computing devices (e.g., connected devices 230, 240, 250) while other tasks (e.g., mobile operator identification) can be performed in the cloud 210.

In example environment 200, the cloud 210 provides services for connected devices 230, 240, 250 with a variety of screen capabilities. Connected device 230 represents a device with a computer screen (e.g., a mid-size screen 235). For example, connected device 230 could be a desktop, laptop, notebook, netbook or tablet computer or the like. Connected device 240 represents a mobile computing device with a mobile computing device screen 245 (e.g., a small-size screen). For example, connected device 240 could be a mobile phone, smartphone, personal digital assistant or the like. Connected device 250 represents a device with a large screen 255. For example, connected device 250 could be a television with Internet connectivity, or a television connected to another device capable of connecting to the cloud such as a set-top box, gaming console or the like. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touch screen capability of a particular connected device (e.g., connected devices 230, 240, 250). Services that can be provided by the service providers 220 include, for example, email, Short Message Service (SMS), Multimedia Message Service (MMS), mobile operator identification, social networking and website hosting. The service providers can host online marketplaces offering wide varieties of goods and services such as software applications and upgrades and media content which can be obtained by users with or without purchase and for download from the cloud or delivery through postal mail.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

The technologies and tools described herein allow for the identification of the mobile operator of a mobile computing device. The mobile operator of a mobile computing device (mobile operator) is an entity that provides mobile network services to a mobile computing device. The mobile operator can be a Mobile Network Operator (MNO) that possesses the infrastructure and frequency allocation to operate as an independent mobile network, such as Verizon Wireless®, T-Mobile®, Vodaphone®, or a Mobile Virtual Network Operator (MVNO) that leases usage of a MNO's network. Mobile operator identification allows a mobile device user to take advantage of commercial relationships between the mobile device manufacturer or provider (mobile device provider) and a mobile operator, ensures that messages and branding information specific to the mobile operator is displayed at the mobile device when appropriate, and that billing information is provided in a manner and format specific to the mobile operator.

In a first exemplary mobile operator identification scenario, mobile devices capable of accepting multiple smart cards or individual smart cards storing multiple subscriber identities switch between identities. In one example, a GSM device with two SIM cards can have access to a first subscriber identity associated with a first mobile operator providing network services over a first geographical coverage area, and a second subscriber identity associated with a second mobile operator providing network services in a second geographical coverage area. The second subscriber identity may provide the mobile device user with lower service charges compared to those charged by the first mobile operator when the device is operated outside of the first geographical coverage area. That is, the second mobile operator may charge fees that are lower than the first mobile operator's roaming charges. When the device switches from one subscriber identity to another, the device can send a mobile operator identification request to a mobile operator identification server or service to correctly identify the mobile operator associated with the active subscriber identity.

In a second exemplary mobile operator identification scenario, a mobile virtual network operator (MVNO) provides access to mobile network resources leased from a parent mobile network operator. MVNO smart cards can store data similar to that stored in a parent mobile operator smart card. For example, the MCC/MNC values in an MVNO SIM card can be the same as those stored on parent MNO SIM cards. In this case, the mobile identification server (or service) can look to additional data provided by the mobile computing device as part of the mobile operator identification request to identify the mobile operator.

In a third exemplary mobile operator identification scenario, the mobile device can be an open market phone that is not branded or customized for a particular mobile operator, and the mobile device user can select the mobile operator of his or her choosing by swapping smart cards (e.g., SIM, R-UIM, UICC cards). An open market mobile device can be configured to send a mobile operator identification request when the device detects the insertion of a smart card. For example, a GSM mobile phone can send a mobile operator identification request when it detects that the user has swapped SIM cards, and a CDMA mobile phone can send a mobile operator identification request when it detects that a user has swapped R-UIM cards.

In a fourth scenario, the mobile device can be a dual mode device that operates as a CDMA phone that is tied to mobile operator A in the United States, and is capable of accessing GSM networks located elsewhere. If the device user, while traveling in Europe, for example, inserts a SIM card associated with mobile operator B into the device, the mobile operator can still be identified as mobile operator A if the mobile operators A and B have a business arrangement to that effect. That is, such an arrangement can stipulate that if mobile operator B supplies GSM network access to the dual mode device, the user still sees bills from mobile operator A, and mobile operator A messages and branding information are still presented at the mobile device. Alternatively, if there is no business arrangement between mobile operators A and B, the mobile operator is identified as mobile operator B while the device is accessing the GSM network, even though the device is a CDMA phone tied to mobile operator A.

Figure 3:
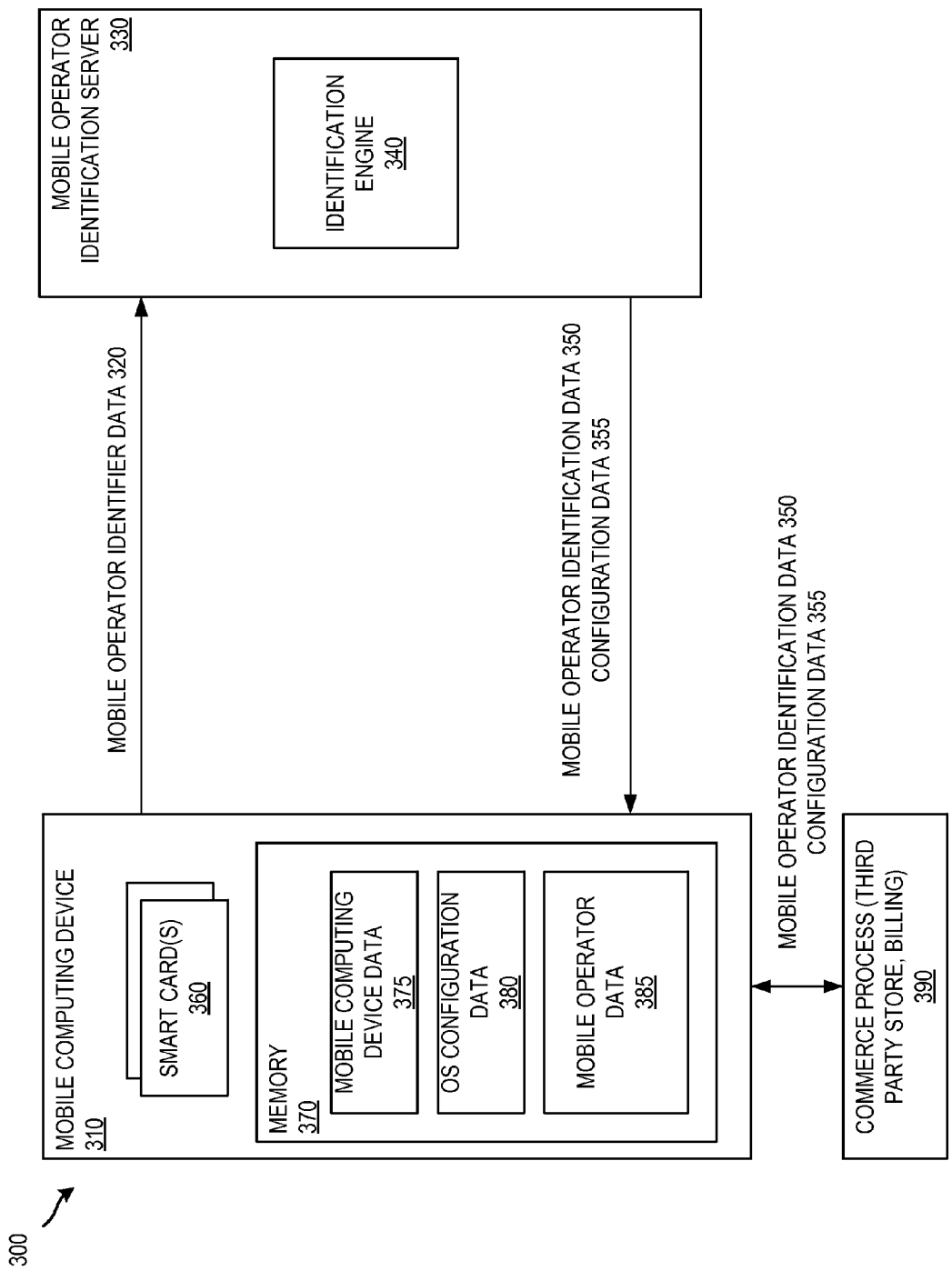
FIG. 3 is a block diagram of an exemplary system for identifying a mobile operator of a mobile computing device.

FIG. 3 is a block diagram of an exemplary system 300 for identifying a mobile operator of a mobile computing device 310. The mobile computing device 310 collects mobile operator identifier data (identifier data) 320 stored in one or more smart cards 360 and memory 370 and sends the data to a mobile operator identification server 330. The identification server 330 comprises an identification engine 340 that determines the mobile operator based on the mobile operator identifier data 320 and returns mobile operator identification data 350 and configuration data 355 to the mobile computing device 310.

The mobile computing device 310 can be a GSM device, a CDMA device, a dual-mode GSM/CDMA phone or any other mobile computing device described herein. The mobile device 310 comprises one or more smart cards 360 and memory 370 storing mobile operator identifier data 320.

The smart cards 360 can be any of the smart cards described herein and any data stored in the smart cards (e.g., IMSI, ICCID) can be in the mobile operator identifier data. The memory 370 comprises mobile computing device data 375 and operating system (OS) configuration data 380. Mobile computing device data 375 can comprise one or more of the following: CDMA and GSM radio serial numbers; IMEI, ESN, UIMID, EUIMID or MEID data; and NAI data. Operating system configuration data 380 can comprise mobile operator identifier data such as mobile operator ID data. Any portion of the mobile computing device data 375 and the operating system configuration data 380 can be sent to a mobile operator identification server 330 as part of a mobile operator identification request.

The mobile operator identifier data 320 can comprise any data that can be used by the mobile operator identification server 330 in identifying a mobile operator. For example, as MNOs or MVNOs appear, dissolve, merge or expand into new geographic regions, data other than the identifiers and other data previously discussed may be needed to uniquely identify a mobile operator. Alternatively, a mobile operator can modify or add data stored in a smart card, or a mobile computing device provider can add additional equipment identifier data that can be used in identifying a mobile provider. In addition, mobile communication and smart card standards and protocols can evolve or new standards and protocols can appear that define additional data that can be useful to the identification server 330 in identifying a mobile operator. Thus, the mobile identifier data 320 is an expandable and dynamic collection of data.

The mobile computing device 310 sends the mobile operator identifier data 320 to the mobile operator identification server 330 as part of a mobile operator identification request. The device can use pre-coded APIs to pull or "scrape" the mobile operator identifier data 320 from the smart cards 360 and the memory 370. The mobile computing device 310 can be configured to contain a list (mobile operator identifier list) that comprises a plurality of mobile operator identifier fields or parameters (e.g., MCC, MNC, MSIN) that can be used by the identification server 330, and collect as much of that information identified in the list that is available on the particular mobile computing device 310. The mobile operator identifier data 320 can include values for the fields in the list. The particular contents of the identifier data 320 sent to the server 330 can be based on the type of mobile computing device 310. For example, if the mobile device 310 is a single-mode GSM device, CDMA-related data such as MIED and NAI data may not be included in the mobile operator identifier data 320. Similarly, if the device 310 is a single-mode CDMA phone, the identifier data 320 may not contain data stored on GSM SIM cards such as elementary files (e.g., EF_ONS, EF_SPN, EF_GID1). If the data stored in the smart cards 360 comprises more than one subscriber identities, the mobile operator identifier data 320 can include information associated with the identity that is currently active or information associated with more than one stored identities. The identifier data 320 can be sent over a secure connection to the server 330 to ensure the security of the subscriber identifying information included in the identification request.

The mobile computing device 310 can submit a mobile operator identification request to the mobile operator identification server 330 when the device is first turned on, when the device detects insertion of a smart card, when the device detects the user has switched subscriber identities, when the device switches to or from roaming mode, or in response to various other events. Identification requests can be made at periodic intervals or at any other time. The mobile computing device can make an identification request in response to receiving a command from the identification server 330 for the mobile device to make such a request. The identification server 330 can make such a request, for example, after mobile operator rules (discussed below) have been updated.

The mobile operator identification server 330 can be a remote (cloud-based) server operated by a mobile computing device provider or any other party. The server 330 comprises an identification engine 340 that attempts to identify a mobile operator (identified mobile operator) based on the mobile operator identifier data 320 sent to the server 330 from the mobile computing device 310.

The identification engine 340 attempts to identify the mobile operator by comparing the received mobile operator identifier data 320 against a plurality of mobile operator rules. The mobile operator rules are associated with one or more mobile operators. Typically, each mobile operator rule is associated with a mobile operator, and each rule specifies a set of conditions that are to be satisfied in order for the mobile operator associated with the rule to be identified as the mobile operator for the mobile computing device. Mobile operator rules specify conditions for any number of parameters in the identifier data, and generally specify conditions for less than all of the parameters received in a set of identifier data. For example, a first condition in a mobile operator rule can specify that MCC=X, a second condition can specify that MNC=Y, and third condition can specify that MSIN is within a range of values. In one embodiment, the identification server 330 receives identifier data 320 comprising values for 17 parameters, and individual mobile operator rules specify conditions for 1 to 6 parameters. Thus, in this particular embodiment, if each mobile operator rule is associated with an individual mobile operator, no individual mobile operator requires more than six parameters to be examined in order to identify that particular operator as the mobile operator. Different rules can look at different sets of parameters to identify different mobile operators.

In some embodiments, the identification engine 340 identifies a mobile operator by examining the rules one at a time until a match is found. For example, for a current mobile operator rule being examined, the identification engine 340 applies the conditions specified in the rule one at a time to the mobile operator identifier data 320 until either all of the conditions are found to be satisfied, or one of the conditions is not satisfied. If at least one of the conditions is not satisfied by the identifier data, the identification engine 340 moves on to the next mobile operator rule. If all conditions of a rule are satisfied, the identification engine 340 can identify the mobile operator associated with the matched rule as the identified mobile operator, and rule checking is ceased. Alternatively, the identification engine 340 can check the remaining mobile operator rules to see if any other rules are satisfied. If more than one rule is satisfied and the matched rules are associated with the same mobile operator, that mobile operator is the identified mobile operator for the mobile device supplying the identifier data. If the matched rules are associated with different mobile operators, the identification engine 340 can determine that the mobile operator cannot be unambiguously resolved and does not identify a mobile operator. If there are no matches, or if the matches give an ambiguous result, the server cannot reply to the mobile operator identification request from the mobile computing device 310 or it can send an indication to the mobile computing device 310 that the mobile operator could not be identified.

In one example of mobile operator rules, mobile operators A and B operating in the same country are not distinguishable by their MCC (mobile country code) and MNC (mobile network code) values alone, but are distinguishable based on MSIN (Mobile Subscription Identifier Number) values. Thus, a mobile operator rule for mobile operator A can specify the conditions that MCC=X, MNC=Y and that MSIN falls within a first range, and a mobile operator rule for mobile operator B can specify the conditions MCC=X, MNC=Y and that MSIN falls within a second range. Other mobile operator rules for other mobile operators (or for mobile operators A and B operating in another country) may be distinguishable based on MCC/MNC values. Accordingly, such mobile operator rules need only specify two conditions (that the MCC and MNC values match certain values) in order for the mobile operator to be identified. Still other mobile operator rules can include conditions that specify elementary file values. For example, mobile operator rules can include a condition that EF_SPN, EF_ONS, EF_GID1, EF_GID2, EF_PNN or EF_OPL data match certain values. For instance, mobile operator rules for identifying a mobile operator associated with an R-UIM can include conditions that EF_PNN and/or EF_OPN data match certain values.

In some embodiments, the mobile operator rules are collectively embodied by a decision tree that the engine 340 traverses depending on the values of the received identifier data. Nodes in the decision tree can be associated with mobile operator identification fields (e.g., MCC) and branches of a node can indicate a condition associated with the field (e.g., MCC=X, MCC=Y, MCC=Z). Paths in the decision tree from the root node to a leaf node can be associated with a mobile operator rule. The identification engine 340 can start at the root of the decision tree and follow the appropriate branch of decision nodes depending on the outcome of each decision. The engine can traverse the decision tree until it reaches a leaf node. A condition at a leaf node being satisfied can indicate satisfaction of a mobile operator rule.

Given the large number of mobile operators, mobile virtual network operators and the business relationships between them, an identification engine 340 can contain a large number of mobile operator rules. These rules can be updated to reflect the emergence of new MNOs or MVNOs, the acquisition and merger of MOs with other MOs or MVNOs, the dissolution of MNOs and MVNOs, the expansion of mobile operators into new geographic areas and the like. Given the rate at which the mobile operator business landscape changes, updating the identification engine 340 of a centralized identification server or service can avoid frequently pushing software updates to mobile computing devices worldwide (of which there are a multitude) if the identification engine 340 were implemented locally at the mobile device 310. Rules associated with a mobile operator can be updated to specify conditions for more or fewer parameters. Mobile operator rules can also be modified in response to changes in mobile communication or smart card protocols or standards.

In some embodiments, if the identification engine 340 indicates that a mobile operator cannot be identified, the engine 340 notifies personnel responsible for managing the identification server 330. The notification includes the identifier data resulting in failure of the engine to identify the mobile operator. If the personnel determine that the reported identifier data uniquely identifies a mobile operator, the personnel can add new mobile operator rules to the set of mobile operator rules or modify existing ones. If the identification engine 340 utilizes a decision tree to resolve mobile operator identity, the decision tree can be updated. An updated mobile operator identifier list can be received by the mobile computing device 310 in response to a change in mobile operator rules, mobile communication or smart card protocols or standards, or the like.

In some embodiments, the identification engine 340 can reside at a computing device (mobile or non-mobile) located locally to the computing device such as a personal computer connected to the mobile device 310 via a wired or wireless connection, or available over a local network, such as a Wi-Fi network. In such embodiments, the mobile operator identification function remains offloaded from the mobile device. In other embodiments, the identification engine 340 is located in the mobile computing device. In embodiments where an identification engine 340 is located external to an identification server 330, the identification engine 340 can be updated remotely to reflect changes in the mobile operator identification rules.

If a mobile operator has been identified, the identification server 330 sends mobile operator identification data 350 and configuration data 355 associated with the mobile operator to the mobile computing device 310. The mobile operator identification data 350 can comprise any information, such as a text string or numeric code that identifies a mobile operator. The configuration data 355 can comprise any information that can be utilized by either the mobile device 310 or a commerce process 390 to take advantage of a commercial relationship between the mobile device provider and a mobile operator. Configuration data 355 can further comprise the Access Point Name (APN) of a mobile operator; image files containing logos, trademarks or other branding graphic elements as well as audio files associated with the identified mobile operator for presentation at the mobile device. The configuration data can also comprise the web address of one or more websites where a mobile device user can take advantage of commercial relationships between the mobile device provider and the identified mobile operator. The configuration data 355 can also comprise bookmarks to be added to the device web browser that directs the user to web sites of the identified mobile operator or mobile device provider, and mobile operator contact information to be added to the device's contact database. The mobile operator identification data 350 and the configuration data 355 can be stored as mobile operator data 385 in the memory 370 of the mobile device 310, and the device can configure itself according to the received configuration data 355.

In one embodiment, a commerce process 390 is a set of computer-executable instructions that can determine whether the configuration data 355 stored in a mobile computing device 310 identifies a mobile provider for which the commerce process 390 allows a mobile device user to take advantage of a commercial relationship between the mobile device provider and a mobile operator. The commerce process 390 can be part of an online marketplace system operated by a mobile device provider or other vendor. That is, a commerce process 390 can be software executing on a server that hosts an online marketplace for a mobile device provider. In some embodiments, the commerce process 390 can be a set of computer-executable instructions that execute on the mobile computing device 310. The commerce process 390 can receive mobile operator identification data 350 and/or configuration data 355 from the mobile computing device.

Proper identification of a mobile operator allows a mobile device user to take advantage of commerce relationships between the mobile device manufacturer and the mobile operator. For example, a mobile device user accessing an online marketplace operated by the mobile device provider may be presented with unique product or service offerings, discounts or other deals if the marketplace determines that the mobile device accessing the store was provided by the mobile device provider and the device's mobile operator is one with which the mobile device provider has a commercial relationship. For example, a mobile device provider can offer special discounts on software applications, peripherals, accessories or other mobile computing devices to users who access mobile networks via one of the mobile device provider's business partners. The unique product or service offerings, discounts or other deals can be presented at a display of the mobile computing device as part of an online marketplace user interface presented at the display of the mobile device 310.

Correct mobile operator identification is also useful in ensuring that the logos, trademarks or other branding information, which can include audio, text, image or video data, of the proper mobile operator is displayed at the mobile device. For example, if a mobile device is using a certain MVNO as its mobile operator, when the user goes to view their monthly bill online, the bill should be indicated as coming from the MVNO, and not the parent MNO. That is, any information in the bill that is specific to a mobile operator (e.g., logos, trademarks, contact information, etc.) should be that of the MVNO and not of the parent MNO (unless the parties have an agreement stating otherwise). Other billing options such as manner of delivery (e.g., email, SMS, MMS, print) should be consistent with that of the mobile operator.

Upon receiving the identity of the mobile operator from the identification server, the mobile computing device 310 can take certain actions to tailor the device configuration to the current mobile operator. For example, the device can access the mobile device provider's online store, determine that there is an application associated with to the device's current mobile operator that can be downloaded and installed on the mobile device 310 that allows a user to manage his subscription, view and pay bills, monitor usage and the like, and present the user with the option to download the application. The device 310 can similarly query the user whether he or she would like to add a bookmark to the mobile device provider's website to the mobile device web browser application.

If the mobile computing device 310 is capable of storing multiple subscriber identities, the mobile device 310 can store the mobile operator for more than one of the subscriptions, not just the mobile operator that is currently providing mobile network services. Thus, the mobile device user can take advantage of any commercial relationships between the mobile device provider and the mobile operators associated with the multiple subscriber identities. In some embodiments, usage frequency information can be stored at the mobile device 310 indicating, for example, when the subscriber identities associated with a particular mobile operator was last used. This usage information can be utilized by a mobile device provider's online marketplaces to determine whether the mobile device user should be presented with special pricings and offerings. For example, a store may offer special deals if the user is currently using the mobile operator, or if the device 310 has used the mobile operator within the past day, week, month or other period.

Figure 4:
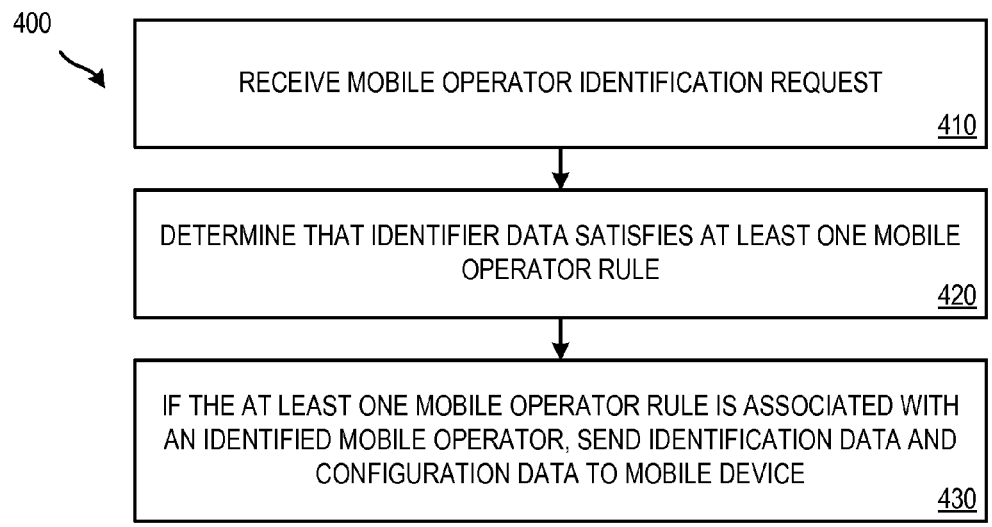
FIG. 4 is a flowchart of a first exemplary mobile operator identification method.

FIG. 4 is a flowchart of a first exemplary mobile operator identification method 400. The method 400 can be performed by mobile operator identification server operated by a smartphone provider. At 410, a mobile operator identification request is received from a mobile computing device. The mobile operator identification request comprises mobile operator identifier data. In the example, the identification server receives a mobile operator identification request from a GSM smartphone. The request comprises mobile operator identifier data stored on the smart card inserted in the smartphone. At 420, it is determined whether the mobile operator identifier data satisfies at least one of a plurality of mobile operator rules. The mobile operator rules are associated with a plurality of mobile operators. In the example, the server determines that the identifier data matches a mobile operator rule associated with mobile operator A.

At 430, if the at least one of a plurality of mobile operator rules are associated with an identified mobile operator, mobile operator identification data identifying the identified mobile operator and configuration data associated with the identified mobile operator is sent to the mobile computing device. The configuration data comprises information that can be utilized by the mobile computing device or a commerce process to take advantage of a commercial relationship between a mobile device provider and the identified mobile operator. In the example, first mobile operator identification data is sent to the mobile computing device. In the example, only one mobile operator rule matches the mobile operator identifier data and mobile operator A identification data is sent to the GSM smartphone. Configuration data associated with mobile operator A is also sent to the GSM smartphone comprising information that can be utilized by a commerce process that is part of an online marketplace hosted by the smartphone provider to provide certain goods and services on the online marketplace for a 10% discount.

In some embodiments of method 400, the method can further comprise adding at least one mobile operator rule to the plurality of mobile operator rules or modifying at least one of the mobile operator rules. In additional embodiments of method 400, the method can further comprise sending a request to the mobile computing device to send a second mobile operator identification request.

Figure 5:
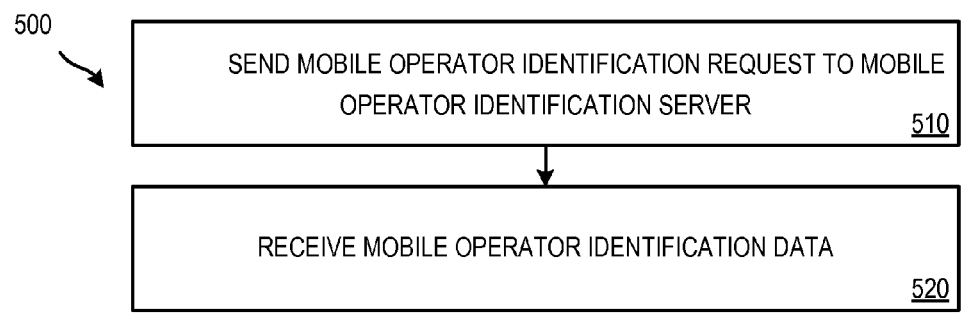
FIG. 5 is a flowchart of a second exemplary mobile operator identification method.

FIG. 5 is a flowchart of a second exemplary mobile operator identification method 500. The method 500 can be performed by, for example, a GSM smartphone holding two SIM cards, a first SIM card storing information representing a subscriber identity associated. with T-Mobile® and a second SIM card storing information representing a subscriber identity associated with AT&T® Mobility. At 510, a mobile operator identification request is sent from a mobile computing device to a mobile operator identification server. The mobile operator identification request comprises mobile operator identifier data. In the example, the smartphone sends a mobile operator identification request to an identification server operated by the smartphone provider. The request comprises data stored on the first SIM card. At 520, mobile operator identification data identifying a mobile operator is received and configuration data associated with the mobile operator from the mobile operator identification server. In the example, the smartphone receives mobile operator identification data identifying T-Mobile® as the mobile operator, and configuration associated with T-Mobile® comprising information that can be utilized by a commerce process executing as part of an online marketplace hosted by T-Mobile® to take advantage of a relationship between the mobile device provider and T-Mobile®.

In some embodiments, the computing device comprises one or more smart card slots and the method 500 further comprises detecting insertion of a smart card into one of the one or more smart card slots, and sending a second mobile operator identification request to the mobile operator identification server, the second mobile operator identification request comprising mobile operator identifier data stored in the smart card. Continuing with the example, the GSM smartphone can detect insertion of a new SIM card in one of the SIM card slots and send a second mobile operator identification request to the identification server containing information pulled from the new SIM card. In some embodiments, the mobile operator identification data and the configuration data can be stored at the mobile computing device.

Figure 6:
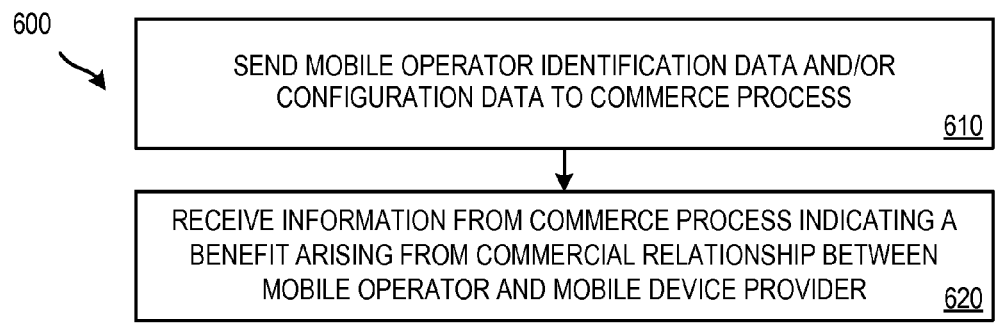
FIG. 6 is a flowchart of an exemplary method of a mobile computing device communicating with a commerce process to allow a user to take advantage of a commercial relationship between a mobile computing device provider and a mobile operator.

FIG. 6 is a flowchart of an exemplary method 600 of a mobile computing device communicating with a commerce process to allow a mobile computing device user to take advantage of a commercial relationship between a mobile computing device provider and a mobile operator. The method 600 can be performed by, for example, a smartphone provided by mobile computing device provider A that has received mobile identification data identifying mobile operator B as the mobile operator for the smartphone, and configuration data associated with mobile operator B comprising information that can be utilized by mobile operator B's online marketplace to offer special deals to the smartphone user. At 610, mobile operator identification data and/or configuration data is sent to a commerce process. In the example, the smartphone sends configuration data indicating that there is a commercial relationship between mobile operator B and mobile computing device provider A. At 620, information from the commerce process is received at the mobile computing device indicating a benefit arising from the commercial relationship. In the example, the smartphone receives from mobile operator B's online marketplace reduced pricings for certain products offered at operator B's marketplace. In some embodiments, method 500 can include 610 and 620 of method 600.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as hard drives)) and executed on a computer (e.g., any commercially available computer, including smartphones or other mobile devices that include computing hardware). Computer-readable storage media does not include propagated signals. Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved. Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation. In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope of these claims.

We claim:

1. A mobile operator identification method comprising:
   receiving a mobile operator identification request from a mobile computing device, the mobile operator identification request comprising mobile operator identifier data;
   determining that the mobile operator identifier data satisfies at least one of a plurality of mobile operator rules, the plurality of mobile operator rules being associated with a plurality of mobile operators, wherein the plurality of mobile operator rules are used to identify which mobile operator, of the plurality of mobile operators, is associated with the mobile computing device;
   if the at least one of the plurality of mobile operator rules are associated with an identified mobile operator, sending mobile operator identification data identifying the identified mobile operator and configuration data associated with the identified mobile operator to the mobile computing device for use in tailoring configuration of the mobile computing device to the identified mobile operator, the configuration data comprising information that can be utilized by the mobile computing device or a commerce process to take advantage of a commercial relationship between a mobile device provider and the identified mobile operator;
   adding one or more mobile operator rules to the plurality of mobile operator rules or modifying one or more of the plurality of mobile operator rules, wherein the adding or modifying one or more mobile operator rules supports adding and modifying Mobile Network Operators (MNOs) and Mobile Virtual Network Operators (MVNOs); and
   in response to the adding or modifying, sending a request to the mobile computing device to send a second mobile operator identification request.

2. The method of claim 1, the mobile operator identifier data comprising a Mobile Subscription Identifier Number (MSIN) value and the at least one mobile operator rules specifying a condition satisfied by the MSIN value.

3. The method of claim 1, the mobile operator identifier data comprising a Mobile Country Code (MCC) value, a Mobile Network Code (MNC) value and at least one additional value, and the at least one mobile operator rules specifying conditions satisfied by the MCC value, the MNC value and the at least one additional value.

4. The method of claim 1, the mobile operator identifier data comprising an elementary file, the at least one mobile operator rules specifying a condition satisfied by the elementary file.

5. The method of claim 1, the determining comprising traversing a path of a decision tree from a root node of the decision tree to a leaf node of the decision tree, the path comprising a plurality of nodes, at least one of the nodes being associated with a decision pertaining to a mobile operator identification field, the path being associated with one of the plurality of mobile operator rules.

6. The method of claim 1, the configuration data further comprising branding information specific to the identified mobile operator.

7. The method of claim 6, wherein the identified mobile operator is a Mobile Virtual Network Operator (MVNO) and the branding information is specific to the MVNO.

8. A mobile operator identification method comprising:
   sending a mobile operator identification request from a mobile computing device to a mobile operator identification server, the mobile operator identification request comprising mobile operator identifier data;
   receiving mobile operator identification data identifying a mobile operator and configuration data associated with the mobile operator from the mobile operator identification server for use in tailoring configuration of the mobile computing device to the identified mobile operator, the configuration data comprising information that can be utilized by the mobile computing device or a commerce process to take advantage of a commercial relationship between a mobile device provider and the mobile operator;
   receiving a request from the mobile operator identification server to send a second mobile operator identification request to the mobile operator identification server in response to new or modified mobile operator rules that support adding and modifying Mobile Network Operators (MNOs) and Mobile Virtual Network Operators (MVNOs); and
   upon receiving the request from the mobile operator identification server, sending the second mobile operator identification request to the mobile operator identification server.

9. The method of claim 8, wherein the mobile operator is a first mobile operator, the method further comprising receiving, in response to sending the second mobile operator identification request, mobile operator identification data identifying a second mobile operator.

10. The method of claim 8, wherein one or more smart cards are inserted in the mobile computing device, the one or more smart cards storing data representing a first subscriber identity and a second subscriber identity, the method further comprising:
    switching from using the first subscriber identity to using the second subscriber identity; and
    sending a third mobile operator identification request to the mobile operator identification server, the second mobile operator identification request comprising a portion of the data representing the second subscriber identity.

11. The method of claim 10, wherein the mobile operator is a first mobile operator, the method further comprising receiving, in response to sending the third mobile operator identification request, mobile operator identification data identifying a second mobile operator.

12. The method of claim 8, wherein the mobile operator identifier data comprises at least a portion of mobile computing device data stored in a memory of the mobile computing device.

13. The method of claim 8, wherein one or more smart cards are inserted in the mobile computing device, the one or more smart cards storing smart card data, the mobile computing device comprises a memory storing mobile computing device data, and the mobile operator identifier data comprises at least a portion of the smart card data and at least a portion of the mobile computing device data.

14. The method of claim 8, wherein the mobile operator is a first mobile operator, the method further comprising:
    sending a third mobile operator identification request to the mobile operator identification server in response to the mobile computing device entering or exiting a roaming mode; and receiving mobile operator identification data identifying a second mobile operator.

15. The method of claim 8, wherein the mobile operator identifier data includes values for a plurality of mobile operator identifier fields included in a mobile operator identifier list stored at the mobile computing device, the method further comprising:
receiving an updated mobile operator identifier list.

16. The method of claim 15, the method further comprising sending a third mobile operator identification request comprising values for a plurality of mobile operator identifier fields included in the updated mobile operator identifier list.

17. The method of claim 8, the method further comprising:
detecting insertion of a smart card into a smart card slot of the mobile computing device; and
sending a third mobile operator identification request to the mobile operator identification server, the third mobile operator identification request comprising mobile operator identifier data stored from the smart card.

18. One or more computer-readable storage media storing computer-executable instructions for causing a mobile computing device to perform a method, the method comprising:
receiving a mobile operator identification request from a mobile computing device, the mobile operator identification request comprising mobile operator identifier data comprising values for a plurality of mobile operator identifier data fields in a mobile operator identifier list stored in the mobile computing device, the mobile operator identifier data comprising a Mobile Country Code (MCC) value, a Mobile Network Code (MNC) value and at least one additional value;
determining that the mobile operator identifier data satisfies at least one of a plurality of mobile operator rules, the plurality of mobile operator rules being associated with a plurality of mobile operators, wherein the plurality of mobile operator rules are used to identify which mobile operator, of the plurality of mobile operators, is associated with the mobile computing device;
if the at least one of the plurality of mobile operator rules are associated with an identified mobile operator, sending mobile operator identification data identifying the identified mobile operator and configuration data associated with the identified mobile operator to the mobile computing device for use in tailoring configuration of the mobile computing device to the identified mobile operator, the configuration data comprising information that can be utilized by the mobile computing device or a commerce process to take advantage of a commercial relationship between a mobile device provider and the identified mobile operator, the at least one mobile operator rule specifying conditions satisfied by the MCC value, the MNC value and the at least one additional value, the configuration data further comprising branding information specific to the identified mobile operator;
adding one or more mobile operator rules to the plurality of mobile operator rules or modifying one or more of the plurality of mobile operator rules, wherein the adding or modifying one or more mobile operator rules supports adding and modifying Mobile Network Operators (MNOs) and Mobile Virtual Network Operators (MVNOs); and
in response to the adding or modifying, sending a request to the mobile computing device to send a second mobile operator identification request.

* * * * *